US012492583B2

(12) United States Patent
Guerin et al.

(10) Patent No.: US 12,492,583 B2
(45) Date of Patent: Dec. 9, 2025

(54) VEHICLE DOOR HANDLE ASSEMBLY

(71) Applicant: Minebea AccessSolutions Italia S.p.A, Pianezza (IT)

(72) Inventors: Anthony Guerin, Pianezza (IT); Guillaume Despreaux, Pianezza (IT)

(73) Assignee: Minebea AccessSolutions Italia S.p.A., Pianezza (IT)

(*) Notice: Subject to any disclaimer, the term of this patent is extended or adjusted under 35 U.S.C. 154(b) by 247 days.

(21) Appl. No.: 18/188,767

(22) Filed: Mar. 23, 2023

(65) Prior Publication Data

US 2023/0304334 A1 Sep. 28, 2023

(30) Foreign Application Priority Data

Mar. 23, 2022 (EP) .................................... 22163915

(51) Int. Cl.
*E05B 85/10* (2014.01)
*E05B 81/00* (2014.01)

(52) U.S. Cl.
CPC .................................. *E05B 85/107* (2013.01)

(58) Field of Classification Search
CPC ..... E05B 85/103; E05B 85/107; Y10S 292/22
See application file for complete search history.

(56) References Cited

U.S. PATENT DOCUMENTS

| | | | | |
|---|---|---|---|---|
| 3,719,248 A * | 3/1973 | Breitschwerdt | E05B 77/06 180/282 |
| 6,709,033 B2 * | 3/2004 | Jooss | E05B 85/16 292/336.3 |
| 9,567,777 B1 * | 2/2017 | VandenBrink | E05B 77/02 |
| 9,810,005 B2 * | 11/2017 | Rocci | E05B 77/06 |
| 9,856,675 B2 * | 1/2018 | Ilardo | E05B 85/16 |
| 10,787,842 B2 * | 9/2020 | Savant | E05B 79/20 |
| 11,214,994 B2 * | 1/2022 | Han | E05B 81/90 |
| 11,441,340 B2 * | 9/2022 | Rhein | E05B 81/42 |
| 2016/0298366 A1 | 10/2016 | Och | |
| 2020/0115936 A1 | 4/2020 | Och | |
| 2020/0392771 A1 * | 12/2020 | Toyama | E05B 85/103 |
| 2021/0156178 A1 | 5/2021 | Heyduck et al. | |
| 2021/0363794 A1 * | 11/2021 | Rhein | E05B 81/90 |
| 2021/0381284 A1 * | 12/2021 | Toyama | E05B 77/06 |

FOREIGN PATENT DOCUMENTS

| | | | |
|---|---|---|---|
| DE | 10 2018 214 372 B3 | 1/2020 | |
| EP | 3396088 A1 * | 10/2018 | E05B 77/06 |

OTHER PUBLICATIONS

Extended European Search Report Issued Sep. 9, 2022 in European Application 22163915.6, 8 pages.

* cited by examiner

*Primary Examiner* — Carlos Lugo
(74) *Attorney, Agent, or Firm* — Oblon, McClelland, Maier & Neustadt, L.L.P.

(57) ABSTRACT

A vehicle door handle assembly includes a bracket and a deploying mechanism configured to move a handle grip between a flushing and a deployed position. The deploying mechanism includes at least one lever having a front lever, a rear lever, a recess on the bracket, a contact surface on the at least one lever, and a blocking lever placed between the recess and the contact surface. The blocking lever configured to move from a first position, when the handle grip is flush, to a second position, when the handle grip is deployed, in its second position, the blocking lever is pressed against the recess on the bracket and against the contact surface, thereby blocking the rotation of the at least one lever in its first position.

12 Claims, 8 Drawing Sheets

VEHICLE DOOR HANDLE ASSEMBLY

TECHNICAL FIELD

The present invention relates to the field of vehicle door handles, in particular of the type with a flushing door handle grip. Such vehicle door handle assemblies generally comprise an electric motor which, when actuated, moves the handle grip between a flushing position in which the handle grip is flush with an exterior door panel surface and a deployed position in which said handle grip is protruding and graspable by a user. The electric motor is generally connected to an actuator gearbox and to a deploying mechanism which is configured to move the handle grip from the flushing position to the deployed position. In the flushing position, the air drag of the vehicle can be reduced, while the visual aspect of the vehicle can be streamlined. In the deployed position, the handle grip is protruding from said exterior surface, so as to be graspable by a user. The user can seize the handle and pull on it in order to unlock and/or open the vehicle door.

BACKGROUND OF THE INVENTION

When the handle grip is in the deployed position, it is protruding from the exterior surface of the door body. The handle grip is hence very exposed to its immediate environment. Usually, the stability of the handle grip in the deployed position, which translates as the ability of the handle grip to stay in the deployed position despite a pressure or a shock being applied to it, is insured by the friction in the actuator gearbox. But when the pressure and/or the shock applied on the deployed handle grip exceeds a given threshold, the load transmitted to the actuator gearbox can cause severe damage, which in the worst case can result in a breakage of the actuator gearbox and/or of the deploying mechanism. For instance, if a user pushes too hard on the deployed handle grip, the deploying mechanism will most likely cease to resist the resulting pressure. Consequently, there is a need for an improved and reliable deploying mechanism that ensures the stability of the handle grip in the deployed position while also avoiding damage to the actuator gearbox in case an important pressure and/or a violent shock is exerted on the handle grip.

SUMMARY OF THE INVENTION

It is therefore a goal of the present invention to overcome at least partially the previous drawbacks of the state of the art and to provide a solution to avoid damage to the actuator gearbox in case a load and/or a shock is exerted on the handle grip when the latter is in the deployed position.

Thus, the present invention refers to a vehicle door handle assembly, comprising a bracket and a deploying mechanism configured to move a handle grip between a flushing position in which the handle grip is flush with an exterior door panel surface and a deployed position in which the handle grip is protruding and graspable by a user, said deploying mechanism comprising at least one lever, especially a front lever and a rear lever, which respectively comprise a first pivot connection to the handle grip at a first end and a second pivot connection with the bracket, the rotation of the at least one lever, especially the front lever and the rear lever, around said second pivot connections permitting to move the handle grip between its flushing position and its deployed position, the at least one lever, especially the front lever and the rear lever, also respectively comprising a third pivot connection with at least one linking rod at their second end, the vehicle door handle assembly being characterized in that the deploying mechanism further comprises:

a recess on the bracket, a contact surface on the at least one lever, especially on any of the front lever or the rear lever, and a blocking lever placed between said recess and said contact surface, the blocking lever having a pivot connection with the bracket, the blocking lever being configured to move from a first position, when the handle grip is flush, to a second position, when the handle grip is deployed, wherein in its second position, the blocking lever is pressed on one side against the recess on the bracket and on another side pressed against the contact surface of the at least one lever, especially of anyone of the front lever or the rear lever, thereby blocking the rotation of said at least one lever, especially the front lever or the rear lever, and wherein in its first position, the blocking lever is tilted in such a way that it is no longer pressed either by the recess or by the contact surface, allowing the at least one lever, especially any of the front lever or the rear lever, of the deploying mechanism to rotate around their pivot connection to the handle grip.

According to a further aspect of the invention, the deploying mechanism comprises a locking rod, a first end of the locking rod being connected to the second end of any of the front lever or the rear lever, thus forming a pivot connection, a second end of the locking rod being connected to the blocking lever, thus forming another pivot connection.

According to a further aspect of the invention, the first end of the locking rod is connected to the second end of the front lever, the recess facing the rear lever, and wherein said rear lever comprises the contact surface, the blocking lever being placed between said recess and the rear lever.

According to a further aspect of the invention, the pivot connection between the front lever and the linking rod and the pivot connection between the front lever and the locking rod share a common pivot axis.

According to a further aspect of the invention, the blocking lever comprises a first portion configured to act like a hinge for moving the blocking lever between the first and the second position, and a second portion configured to be pressed on one side against the recess on the bracket and on another side pressed against the contact surface of the at least one lever, especially of any of the front lever or the rear lever, when the blocking lever is in the second position.

According to a further aspect of the invention, the first portion of the blocking lever comprises two straight branches which extend along a given direction, this direction being perpendicular to the axes of the pivot connections in the deploying mechanism.

According to a further aspect of the invention, a part of the second portion of the blocking lever extends in a direction which is be perpendicular to the axes of the pivot connections in the deploying mechanism and there is an angular offset between the direction along which said part of the second portion extends and the direction along which the load resulting from a pressure exerted on the deployed handle grip is oriented.

According to a further aspect of the invention, the recess on the bracket has a complementary shape to an angular area on the second portion of the blocking lever.

According to a further aspect of the invention, the vehicle door handle assembly further comprises an elastic return element configured to move the blocking lever back in the first position when the handle grip is being moved from the deployed position to a protruding unlocking position.

According to a further aspect of the invention, the blocking lever is a one-piece part.

Thus, the vehicle door handle assembly may present one or more of the above characteristics, taken separately or in combination.

In these figures, identical elements have the same reference numbers. An XYZ trihedron is shown in some figures to define the orientation of the vehicle door handle assembly in space. A first direction, noted X, corresponds to a longitudinal direction of the handle. A second direction, denoted Y, is directed to the exterior side of the vehicle door handle assembly. Finally, a third direction, denoted Z, points towards a general upward direction. The directions, X, Y, Z, are orthogonal to each other.

DETAILED DESCRIPTION OF THE INVENTION

The following achievements are examples. Although the specification refers to one or several embodiments, it does not imply that each reference refers to the same embodiment or that the features apply only to a single embodiment.

In the following of the description, the terms front, rear, up, upper, low, lower, vertical, horizontal refer to relative positions or directions when the door handle is assembled to a vehicle. In the description, certain items can be indexed, as the first item or second item. In this case, it is a simple indexing to differentiate and name similar but not identical elements. This indexing does not imply a priority of one element over another and such names can easily be interchanged without going beyond the scope of the present description. Nor does this indexing imply an order in time.

Figure 1A:
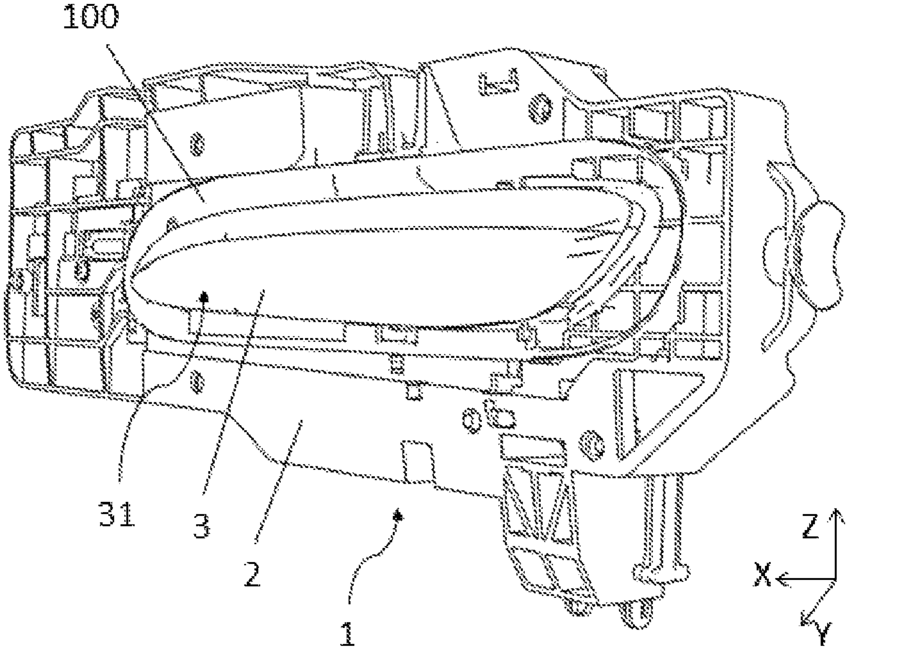
FIG. 1*a* is a front perspective view of a vehicle door handle assembly wherein the handle grip is in the flush position.
Figure 1B:
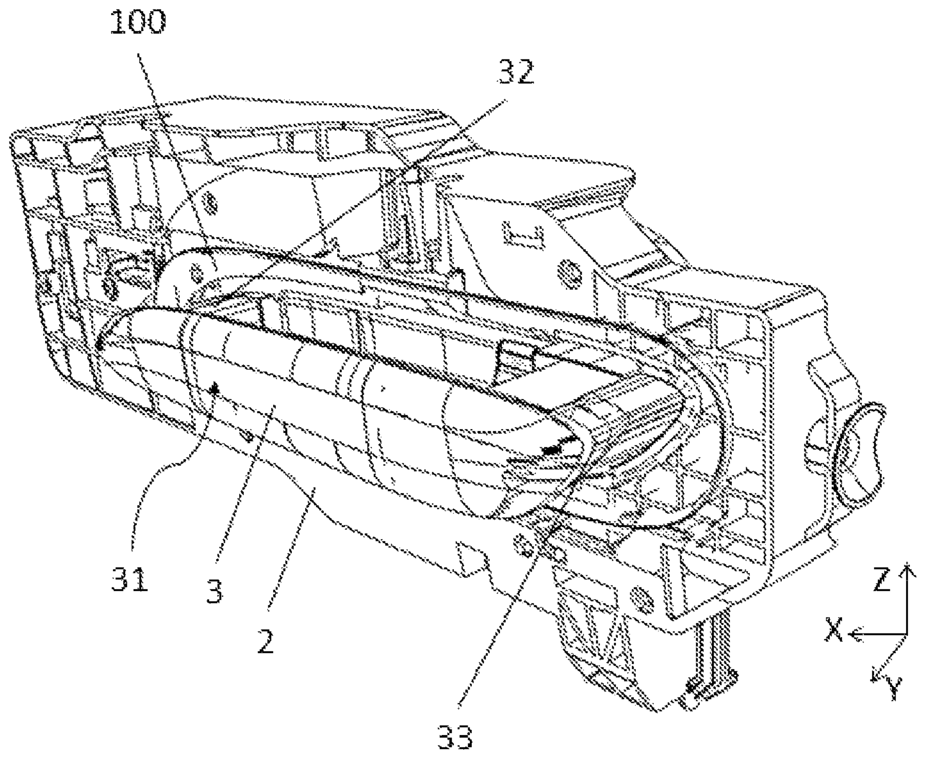
FIG. 1*b* is a similar view to FIG. 1*a* wherein the handle grip is in the deployed position.

FIG. 1*a* and FIG. 1*b* show a vehicle door handle 1 assembly comprising a bracket 2 and a handle grip 3 which is connected to the bracket 2, the handle grip 3 being movable between a flushing position (shown in FIG. 1*a*) in which the handle grip 3 is flush with an exterior door panel surface and a deployed position (shown in FIG. 1*b*) in which the handle grip 3 is protruding and graspable by a user. The movement of the handle grip 3 is usually initiated by an electric motor which is connected to an actuator gearbox and an actuator lever (not shown in the figures). When the electric motor is running, the actuator lever is rotated around an axis. The rotational movement of the actuator lever causes the movement of several other interconnected parts in a deploying mechanism 5 which is also comprised in the vehicle door handle 1 assembly.

In the embodiment of the handle grip 3 shown in FIGS. 1*a*, 1*b*, 2*a*, 2*b* and 2*c*, the handle grip 3 comprises a longitudinal segment 31 forming an external outer shell. When the handle grip 3 is in the flushing position, this external outer shell is the only visible part of the handle grip 3. When the handle grip 3 is in the deployed position, a middle section of the longitudinal segment 31 of the handle grip 3 provides a graspable lever for the user to pull on in order to open the vehicle door. In FIG. 1*a*, the longitudinal segment 31 extends parallel to the direction X.

The longitudinal ends of the handle grip 3 each present a protrusion 32, 33 which extends in a direction that is perpendicular to the longitudinal segment 31 forming the external outer shell. In FIG. 1*b*, the protrusions 32, 33 extend parallel to the direction Y. Both protrusions 32, 33 are arranged on the inner side of the vehicle door handle 1 assembly so that they are hidden inside a bracket 2 of the vehicle door handle 1 assembly when the handle grip 3 is in the flushing position. When the handle grip 3 is in the deployed position however, these protrusions 32, 33 protrude from the bracket 2, as shown in FIG. 1*b*.

According to the embodiment of the handle grip 3 illustrated in the FIGS. 1*a*, 1*b*, 2*a*, 2*b* and 2*c*, the protrusions 32, 33 at the longitudinal ends of the handle grip 3 are not identical. They may be distinguished as a front protrusion 32 and a rear protrusion 33. The front protrusion 32 and the rear protrusion 33 of the handle grip 3 are partially hollow.

According to the embodiment of the handle grip 3 illustrated in the FIGS. 1*a*, 1*b*, 2*a*, 2*b* and 2*c*, the handle grip 3 comprises an upper shell and a lower shell, which assembled together form the longitudinal segment 31 and the protrusions 32, 33 at the longitudinal ends of the handle grip 3. The upper shell and a lower shell may be obtained with a moulding process.

As said earlier, the vehicle door handle 1 assembly also comprises a deploying mechanism 5 which is configured to move the handle grip 3 between the flushing position and the deployed position when the electric motor is actuated. The deploying mechanism 5 also provides stability to the handle grip 3 once it has reached the deployed position.

The deploying mechanism 5 comprises at least one lever, especially a front lever 7 and a rear lever 9 which respectively comprise a first pivot connection A, B to the handle grip 3 at a first end.

Figure 2A:
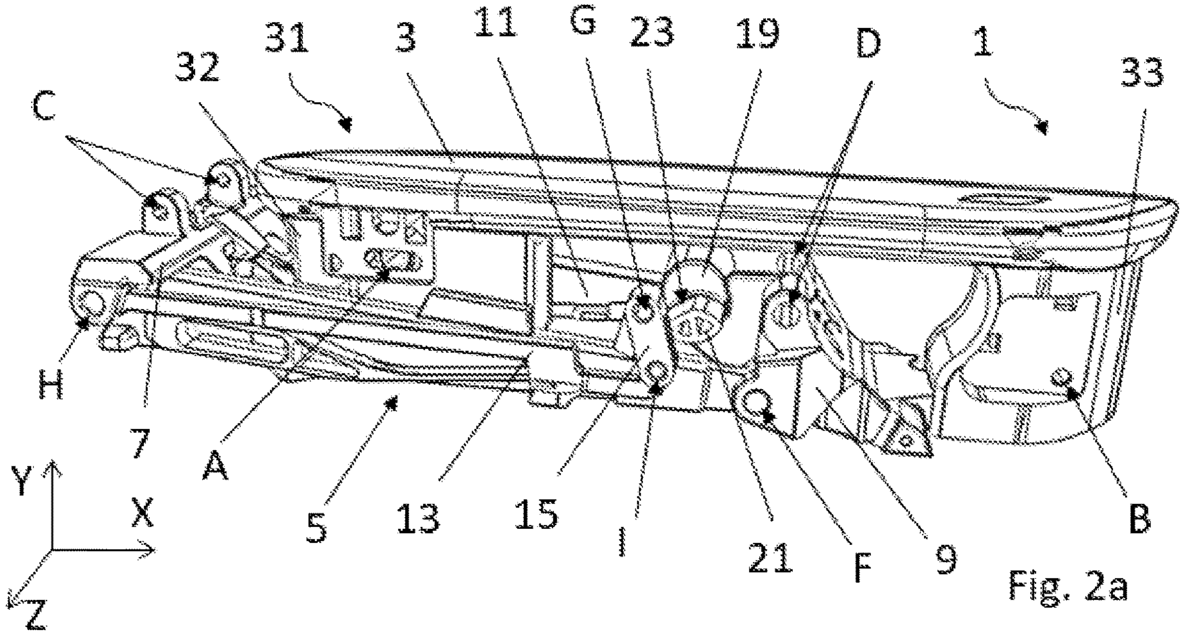
FIG. 2*a* is a side perspective view of the deploying mechanism of the vehicle door handle assembly from FIG. 1*a* wherein the handle grip is in the flush position.
Figure 2B:
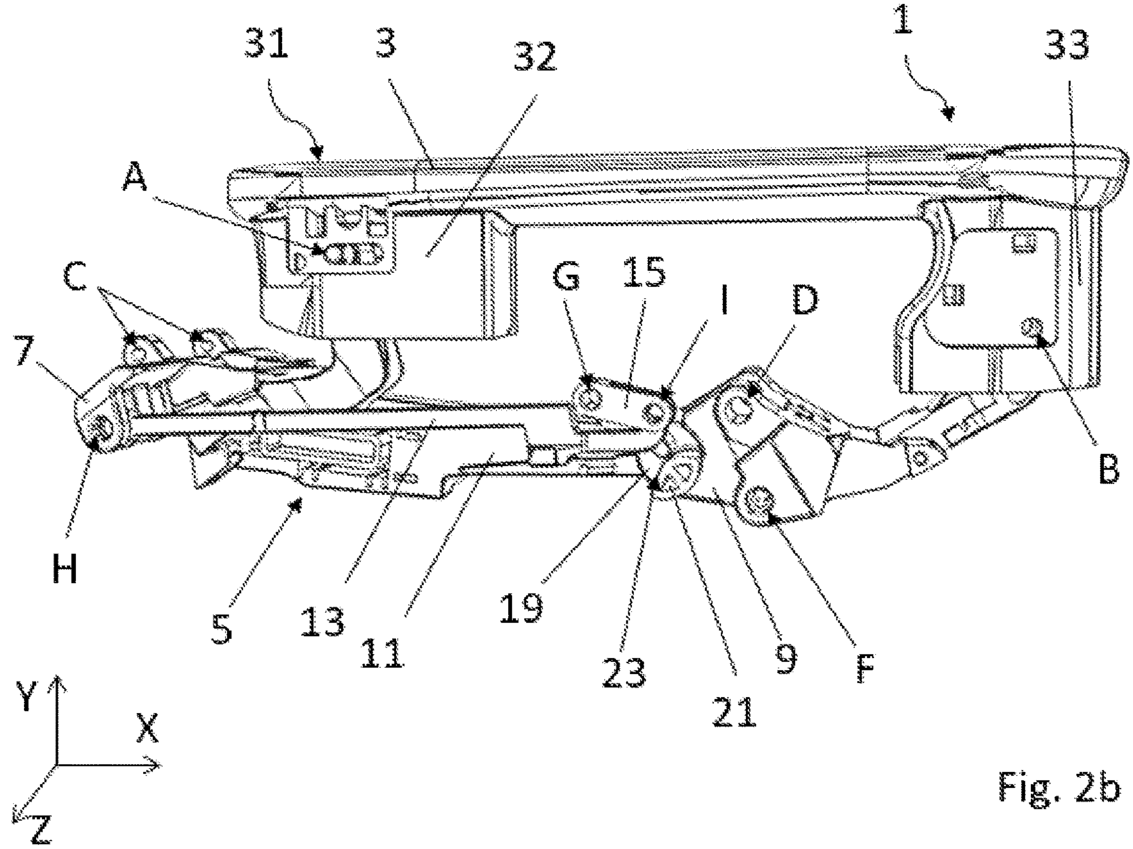
FIG. 2*b* is a similar view to FIG. 2*a* wherein the handle grip is in the deployed position.
Figure 2C:
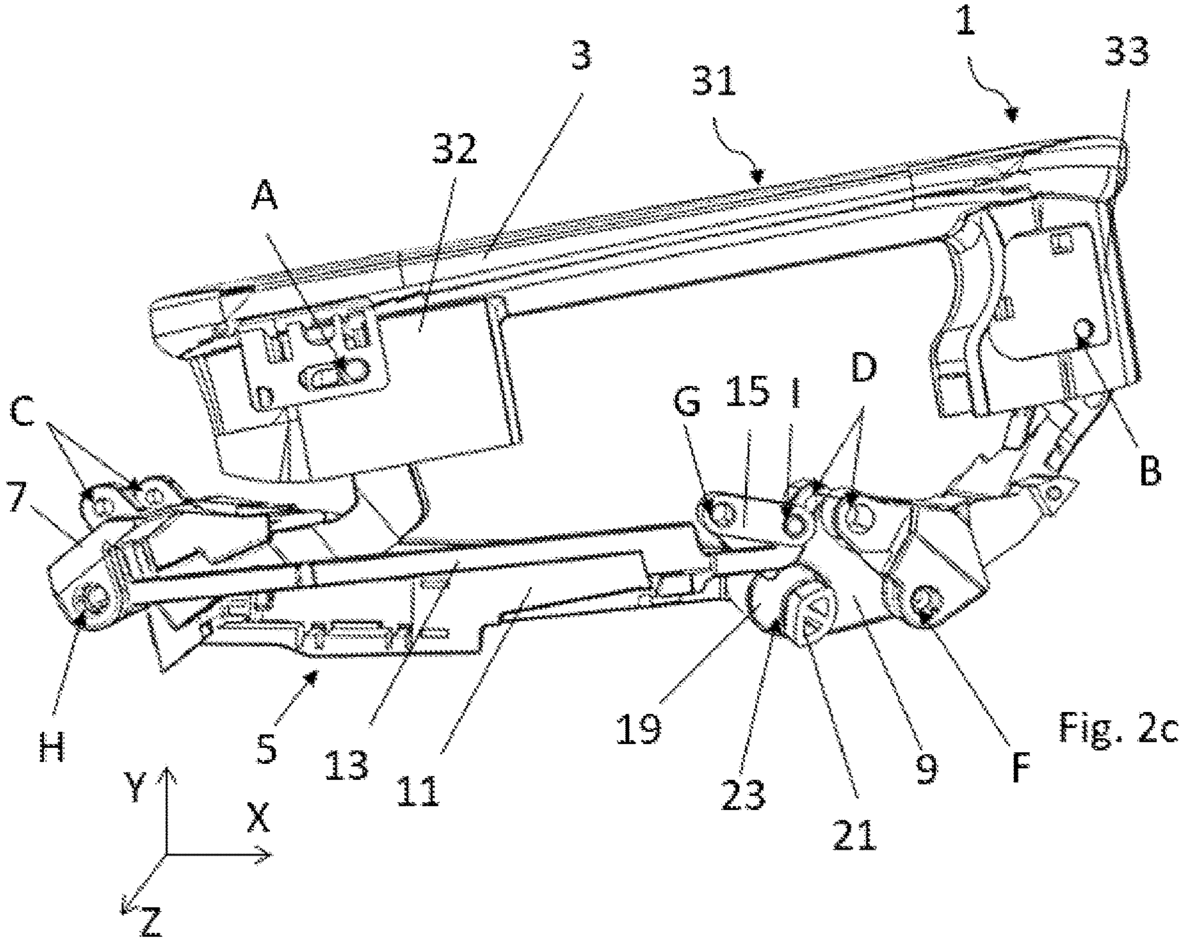
FIG. 2*c* is a similar view to FIGS. 2*a* and 2*b* wherein the handle grip is an unlocking door opening position.

In one embodiment of the deploying mechanism 5 illustrated in FIGS. 2*a*, 2*b*, and 2*c*, the front lever 7 comprises a pivot-slide connection A to the front protrusion 32 of the handle grip 3. According to a specific embodiment of the front lever 7, this front lever 7 presents a hooked shape. A first end of this hook-shaped front lever 7 is arranged inside the hollow front protrusion 32. The pivot-slide connection A allows both a rotational movement around a front axis between the front lever 7 and the front protrusion 32 of the handle grip 3 and a translational move of the first end of the front lever 7 with respect to the front protrusion 32 of the handle grip 3. The direction of this translational movement is here parallel to the direction X.

In one embodiment of the deploying mechanism 5 illustrated in FIGS. 2*a*, 2*b*, and 2*c*, the first pivot connection B connects the first end of the rear lever 9 to the rear protrusion 33 of the handle grip 3. According to a specific embodiment of the rear lever 9, it is also hook-shaped, although its design is quite different from the front lever 7. A first end of this hook-shaped rear lever 9 is arranged inside the hollow rear protrusion 33. This first end of the hook-shaped rear lever 9 works like a hinge, thereby forming the pivot connection B which allows a rotational movement between the rear lever 9 and the rear protrusion 33 of the handle grip 3.

The front lever 7 and the rear lever 9 also respectively comprise a second pivot connection C, D with the bracket 2, as shown in FIGS. 2*a*, 2*b*, 2*c*. The second pivot connections C and D between the bracket 2 and the front lever 7 on one hand and the bracket 2 and the rear lever 9 on the other hand permit to move the handle grip 3 between its flushing position and its deployed position.

When the handle grip 3 is in the flushing position, as shown in FIG. 2*a*, the part of the rear lever 9 that is not stored inside the hollow rear protrusion 33 is arranged between the front protrusion 32 and the rear protrusion 33. Similarly, the part of the front lever 7 that is not located inside the hollow front protrusion 32 is stored beside said front protrusion 32, as can be seen in FIG. 1*a*.

When the handle grip 3 is moved from the flushing position to the deployed position, the at least one lever, and more specifically both the front lever 7 and the rear lever 9 are moved in a rotational movement around their respective second pivot connections C and D with the bracket 2. Simultaneously, the first end of the front lever 7 moves with respect to the front protrusion 32 thanks to the pivot-slide connection A and the first end of the rear lever 9 moves with respect to the rear protrusion 33 thanks to the pivot connection B. The movements of both the front lever 7 and the rear lever 9 are thus connected to the translational movement of the handle grip 3 along the axis Y.

The front lever 7 and the rear lever 9 also respectively comprise a third pivot connection E, F with at least one linking rod 11 at their second end. The front lever 7 and the rear lever 9 are linked to each other by the at least one linking rod 11 in such a way that the linking rod 11 transmits the motion of the front lever 7 to the rear lever 9, thereby synchronising their respective motions when the handle grip 3 is moved from the flushing position to the deployed position. More specifically, when the electric motor which is connected to the actuator gearbox and the actuator lever (not shown in the figures) is running, the actuator lever is rotated around an axis (not shown in the figures), thereby pushing the front lever 7 which in turn moves in a pivoting motion around its own pivot connections A and C. The at least one linking rod 11 transmits the movement to the rear lever 9, so that the rear lever 9 is moved too around its own pivot connections B and D.

According to a specific embodiment illustrated in FIGS. 2*a*, 2*b* and 2*c*, the deploying mechanism 5 comprises two linking rods 11. The two linking rods 11 may be placed on either side of the front lever 7 and the rear lever 9. The linking rods 11 extend in a direction that is substantially parallel to the direction X. For reasons of visibility, only one linking rod 11 has been illustrated in the FIGS. 2*a*, 2*b* and 2*c*, which is why the pivot connection E between the front lever 7 and the linking rod 11 is not visible in said figures.

Figure 3:
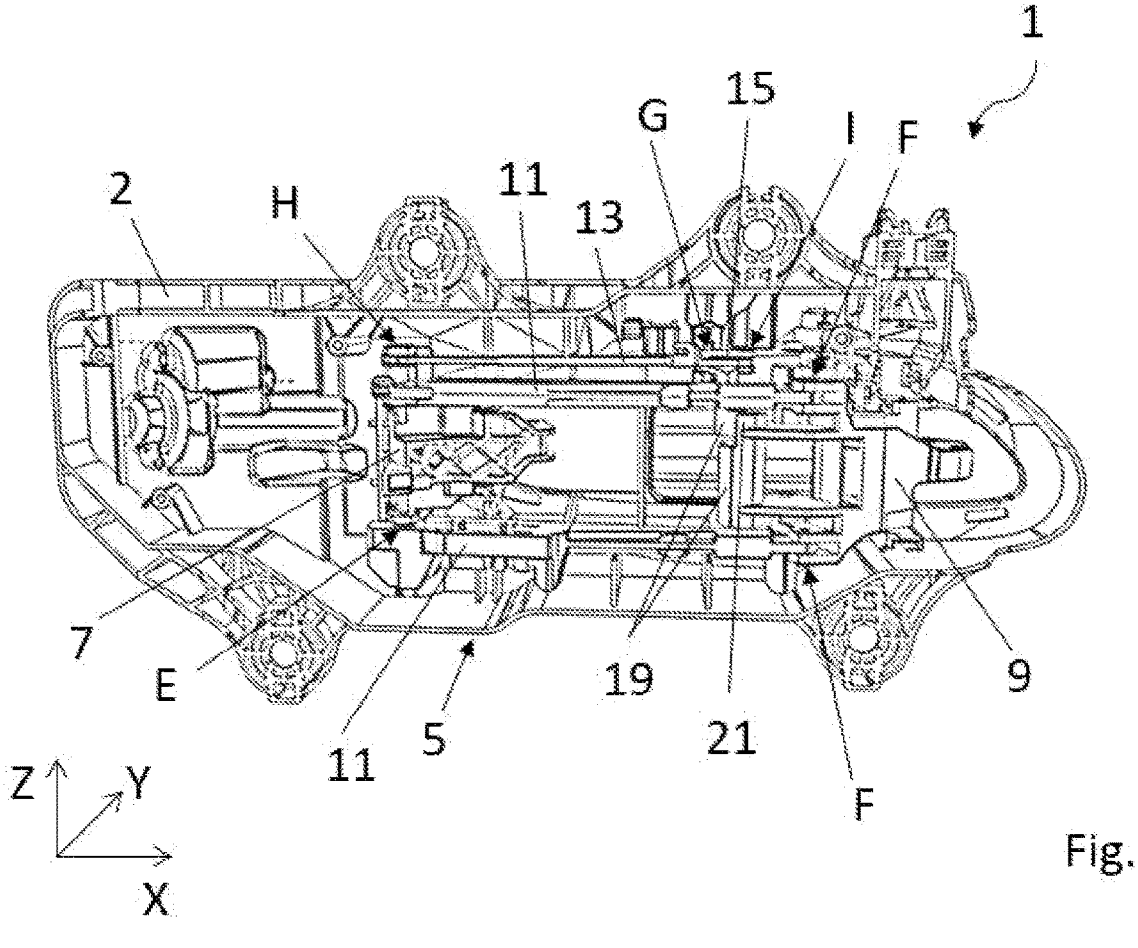
FIG. 3 is a back perspective view of the bracket and the deploying mechanism.

A first end of the at least one linking rod 11 is connected to the second end of the front lever 7 by the third pivot connection E (visible only in FIG. 3) while a second end of the linking rod 11 is connected to the second end of the rear lever 9 by the third pivot connection F. The axis of the third pivot connection E between the front lever 7 and the linking rod 11 is parallel to the axis of the third pivot connection F between the rear lever 9 and the linking rod 11. In fact, the axes of the pivot connections A, B, C, D, E and F can all be parallel to each other.

In order to provide even more security to the deploying mechanism 5, especially when the handle grip 3 is in the deployed position, the deploying mechanism 5 further comprises a recess 14 on the bracket 2, a contact surface 23 of any of the front lever 7 or the rear lever 9, and a blocking lever 15 placed between said recess 14 and said contact surface 23. According to the embodiment shown in FIGS. 4 and 7, the contact surface 23 is located on the rear lever 9.

The blocking lever 15 has a pivot connection G with the bracket 2 and is configured to move from a first position when the handle grip 3 is flush to a second position when the handle grip 3 is deployed.

In its second position, the blocking lever 15 is pressed on one side against a recess 14 on the bracket 2 and on another side pressed against the contact surface 23 of any of the front lever 7 or the rear lever 9, thereby blocking the rotation of said front lever 7 or rear lever 9 in such a way that said front lever 7 or rear lever 9 cannot rotate in the way it would should the handle grip 3 be moved from its deployed position to its flush position. This is particularly illustrated in FIG. 4, where the blocking lever 15 (part of which is hatched because of the partial sectional view) is placed between said recess 14 and the rear lever 9. This specific second position of the blocking lever 15 between the recess 14 on the bracket 2 and the contact surface 23 of the rear lever 9 helps preventing the deploying system 5 from buckling under the pressure when an external load is applied on the handle grip 3. In other words, the at least one lever, and more specifically the front 7 and rear 9 levers move in a given direction when the handle grip 3 is moved from its flush position to its deployed position, but once the blocking lever 15 is in its second position, the blocking lever 15 prevents the front 7 and rear 9 levers from rotating back into the position they had when the handle grip 3 is flush. By blocking the rotation of the at least one lever, and more specifically the front lever 7 or the rear lever 9, the blocking lever 15 prevents the handle grip 3 from being moved accidentally from its deployed position back to its flush position, should a pressure be exerted on the deployed handle grip 3.

In its first position, the blocking lever 15 is tilted in such a way that it is no longer pressed either by the recess 14 or the contact surface 23, allowing any of the front lever 7 or the rear lever 9 of the deploying mechanism 5 to rotate around their pivot connection to the handle grip 3. In the embodiment shown in FIGS. 2*a* and 7, the blocking lever 15 is in its first position and allows the rear lever 9 of the deploying mechanism 5 to rotate simultaneously around the axis of the pivot connection D between the rear lever 9 and the bracket 2 and around the axis A of the pivot connection between the rear lever 9 and the handle grip 3.

The deploying mechanism may further comprise a locking rod 13. A first end of the locking rod 13 is connected to any of the front lever 7 or the rear lever 9 while a second end of the locking rod 13 is connected to the blocking lever 15. In one specific embodiment illustrated in FIGS. 2*a*, 2*b*, 2*c* and 3, the blocking lever 15 is linked to the front lever 7 by means of said locking rod 13. In this particular embodiment, the first end of the locking rod 13 is connected to the second end of the front lever 7, thus forming a pivot connection H, while the second end of the locking rod 13 is connected to the blocking lever 15, thus forming another pivot connection I. In this same embodiment, the recess 14 is facing the rear lever 9.

According to the embodiment illustrated in FIGS. 2*a*, 2*b* and 2*c*, the pivot connection H (between the front lever 7 and the locking rod 13) and the pivot connection E (between the front lever 7 and the linking rod 11) share a common pivot axis. In other words, the front lever 7, the at least one linking rod 11 and the locking rod 13 are all rotatable around the same axis. This arrangement of parts allows for a more compact and space-saving deploying mechanism 5 inside the bracket 2 of the vehicle door handle assembly 1.

Figure 5:
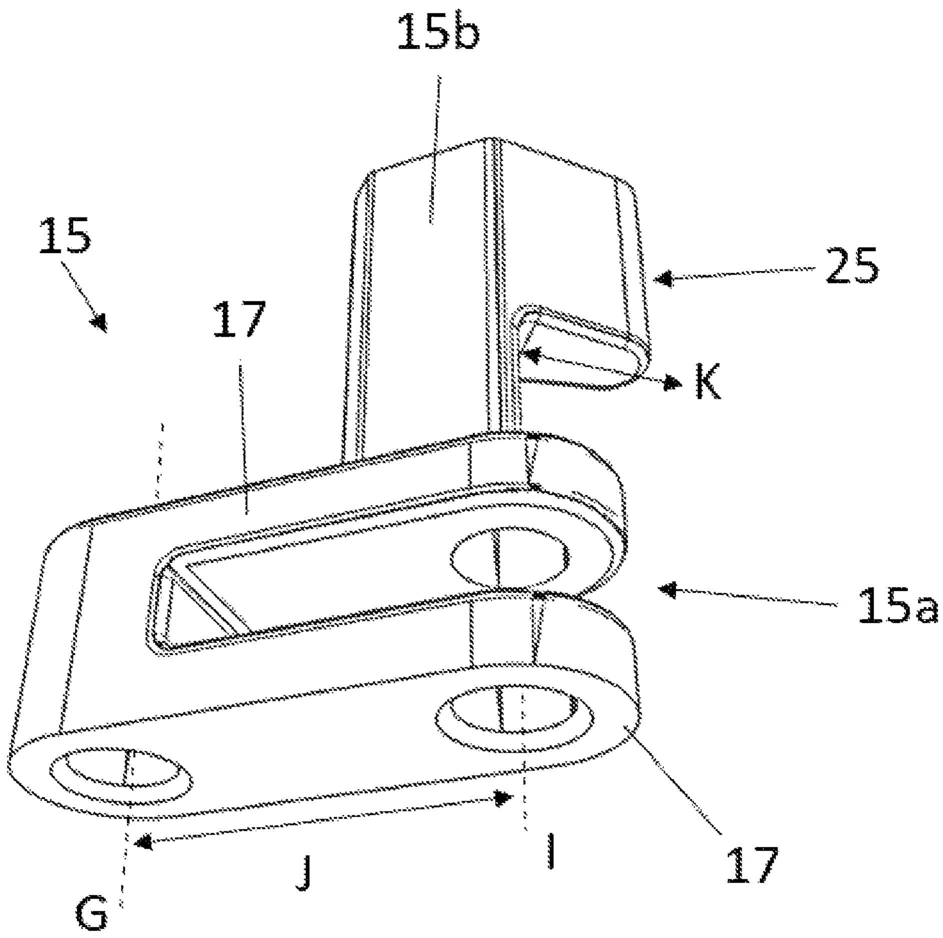
FIG. 5 is a perspective view of the blocking lever.
Figure 6:
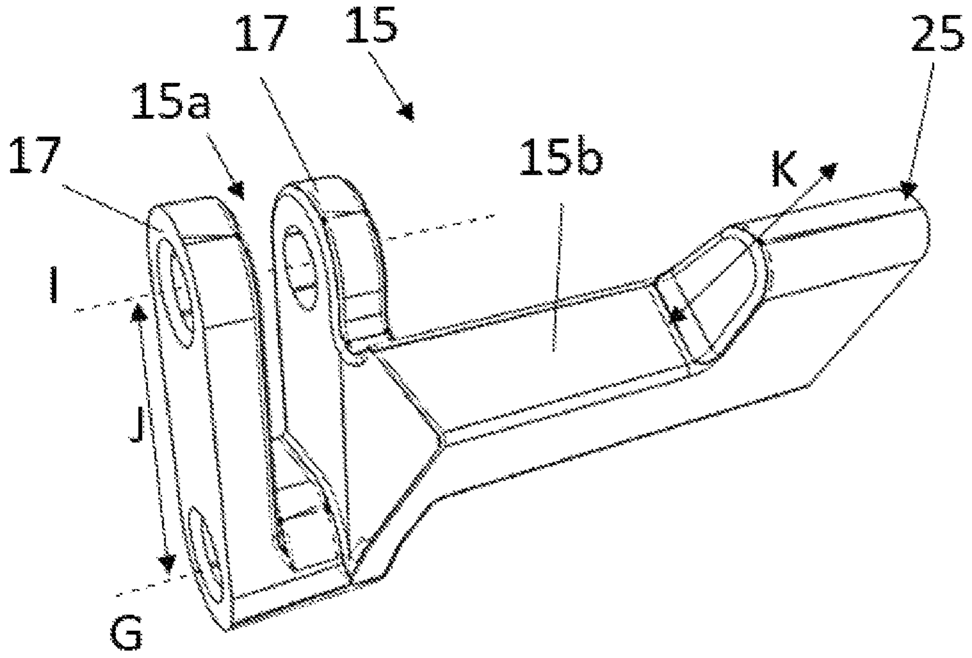
FIG. 6 is another perspective view of the blocking lever.

According to a specific embodiment of the blocking lever 15 shown in FIGS. 5 and 6, the blocking lever 15 is a one-piece part.

According to a preferred embodiment of the blocking lever 15, it comprises two portions 15*a* and 15*b* which have two distinct functions. A first portion 15*a* is configured to act like a hinge for moving the blocking lever 15 between the first and the second position. In this specific embodiment, the first portion 15*a* is specifically configured to act like a hinge for both the pivot connection G between the blocking lever 15 and the bracket 2 on one hand and for the pivot connection I between the blocking lever 15 and the locking rod 13 on the other hand. This first portion 15*a* is designed to make sure that the blocking lever 15 is rotated around the pivot connections G and I when it is moved from the first position to the second position while the handle grip 3 is moved from the flush position to the deployed position.

In the embodiment shown in FIGS. 5 and 6, this first portion 15*a* of the blocking lever 15 is U-shaped, meaning that the first portion 15*a* comprises two straight branches 17 which extend along a direction J (illustrated by a double-headed arrow in FIGS. 5 and 6). This direction J may be perpendicular to the axes of the pivot connections A, B, C, D, E, F, G H and/or I at any time during the motion of the deploying mechanism 5. The two ends of the branches 17 of the U-shaped first portion 15*a* each comprise a hole. The centres of these holes are aligned with the pivot axis I.

In the embodiment shown in FIGS. 5 and 6, the blocking lever 15 also comprises a second portion 15*b* which is specifically configured to be pressed on one side against the recess 14 on the bracket 2 of the vehicle door handle 1 assembly and on another side pressed against the contact surface 23 of any of the front lever 7 or the rear lever 9 of the deploying mechanism 5 when the blocking lever 15 is in the second position. In the embodiment illustrated in FIG. 4, the contact surface 23 against which the second portion 15*b* of the blocking lever 15 is pressed is located on the rear lever 9. In this specific embodiment, this second portion 15*b* is L-shaped. The long side of the L-shape second portion 15*b* extends in a direction which may be parallel to the axes of the pivot connections A, B, C, D, E, F, G H and/or I. The short side of the L-shaped second portion 15*b* extends in a direction K which may be perpendicular to the axes of the pivot connections A, B, C, D, E, F, G H and/or I. The direction K is illustrated by a double-headed arrow in FIGS. 5 and 6.

According to the embodiment of the blocking lever 15 shown in these figures, the direction J along which the two straight branches 17 of the U-shaped first portion 15*a* extend and the direction K along which the short side of the L-shaped second portion 15*b* extends are not the same. There may be an angular offset between these two directions.

Figure 4:
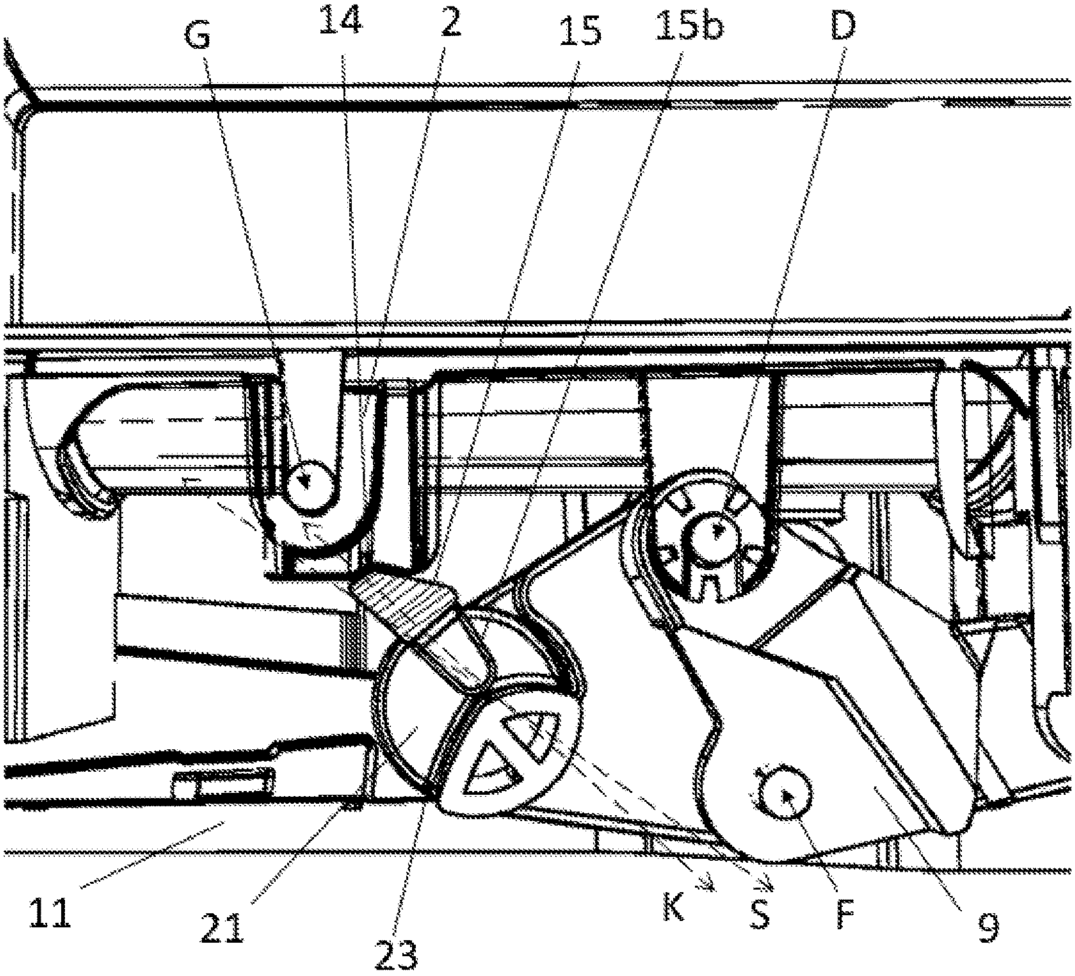
FIG. 4 is a partial sectional view of the vehicle door handle assembly wherein the blocking lever and the rear lever are making contact when the handle grip is in the deployed position.

The angular area where the long side and the short side of the L-shaped second portion 15*b* meet is shaped in such a way that it can be pressed against the recess 14 on the bracket 2 of the vehicle door handle 1 assembly, as shown in FIG. 4. According to this specific embodiment, the recess 14 on the bracket 2 has a complementary shape to said angular area of the second portion 15*b* of the blocking lever 15. The recess 14 is shaped in such a way that it holds the blocking lever 15 in position once it has reached the second position. The complementary shape of the recess 14 further secures the blocking lever 15 and therefore helps preventing the deploying mechanism from buckling under the pressure when an external load is applied on the deployed handle grip 3.

According to the embodiment of the blocking lever 15 shown in FIGS. 5 and 6, a tip 25 of the short side of the L-shaped second portion 15*b* may be round. This tip 25 is configured to make contact with a specific surface 23 on the rear lever 9 of the deploying mechanism 5 when the handle grip 3 is in the deployed position. This is shown in more detail in FIG. 4.

According to the embodiment shown in FIGS. 2*a*, 2*b* and 2*c*, the end of the rear lever 9 that is not located inside the hollow rear protrusion 33 comprises a bulky portion 19 with an axial finger 21 extending in a direction parallel to the axes of the pivot connections A, B, C, D, E, F, G, H and/or I. The axial finger 21 presents a curved surface 23 which is configured to come into contact with the tip 25 of the short side of the L-shaped second portion 15*b* when the handle grip 3 is in the deployed position.

Therefore, both ends of the short side of the L-shaped second portion 15*b* come into contact with other parts of the vehicle door handle 1 assembly when an external pressure or a shock is applied on the deployed handle grip 3.

When the tip 25 is in contact with the curved surface 23 of the axial finger 21 of the rear lever 9, the second portion 15*b* of the blocking lever 15 is oriented in such a way that it blocks the handle grip in the deployed position if a pressure or a shock is applied on the handle grip 3. In other words, when the blocking lever 15 is in the second position, the load resulting from the pressure and/or the shock applied on the deployed handle grip 3 is mostly absorbed by the blocking lever 15 without causing damage to the rest of the deploying mechanism 5. This is because there is a slight angular offset between the direction S along which the force is applied on the deployed handle grip 3 and the direction K along which the short side of the L-shape second portion 15*b* extends. This angular offset is about five degrees, as illustrated in FIG. 4.

By absorbing most of the load resulting from the pressure and/or the shock applied on the deployed handle grip 3, the blocking lever 15 helps stabilising the handle grip 3 in the deployed position. This also helps avoiding a transmission of the resulting load via the deploying mechanism 5 to the actuator gearbox. The blocking lever 15 therefore helps preventing damage made to the actuator gearbox. The blocking lever 15 thereby ensures that the deploying mechanism 5 does not bend or twist or break when a pressure and/or a shock is applied on the handle grip 3 in the deployed position. Therefore, when the handle grip 3 is in the deployed position, the kinematics makes the deploying mechanism 5 irreversible. In other words, once the handle grip 3 is in the deployed position, the interconnected levers 7, 9, 15 and rods 11, 13 of the deploying mechanism 5 are oriented in such a way that the handle grip 3 cannot be forced back into the flush position when it is pushed on.

To unblock the deploying mechanism 5, the user can pull on the handle grip 3, just like when opening the vehicle door. By pulling the handle grip 3 into the opening position (shown in FIG. 2*c*), the interconnected levers 7, 9, 15 and rods 11, 13 of the deploying mechanism 5 rotate further around their respective pivot axis. More specifically, the blocking lever 15 is further rotated around the pivot connections G and I so that the second portion 15*b* of the blocking lever 15 is no longer pressed against the surface 23 of the rear lever.

In order to make sure that the blocking lever 15 returns to the first position after it has been moved to the second position, the deploying mechanism 5 may also comprise an elastic return element 30 configured to move the blocking lever 15 back in the first position when the handle grip 3 is being moved from the deployed position to a protruding unlocking position.

Figure 7:
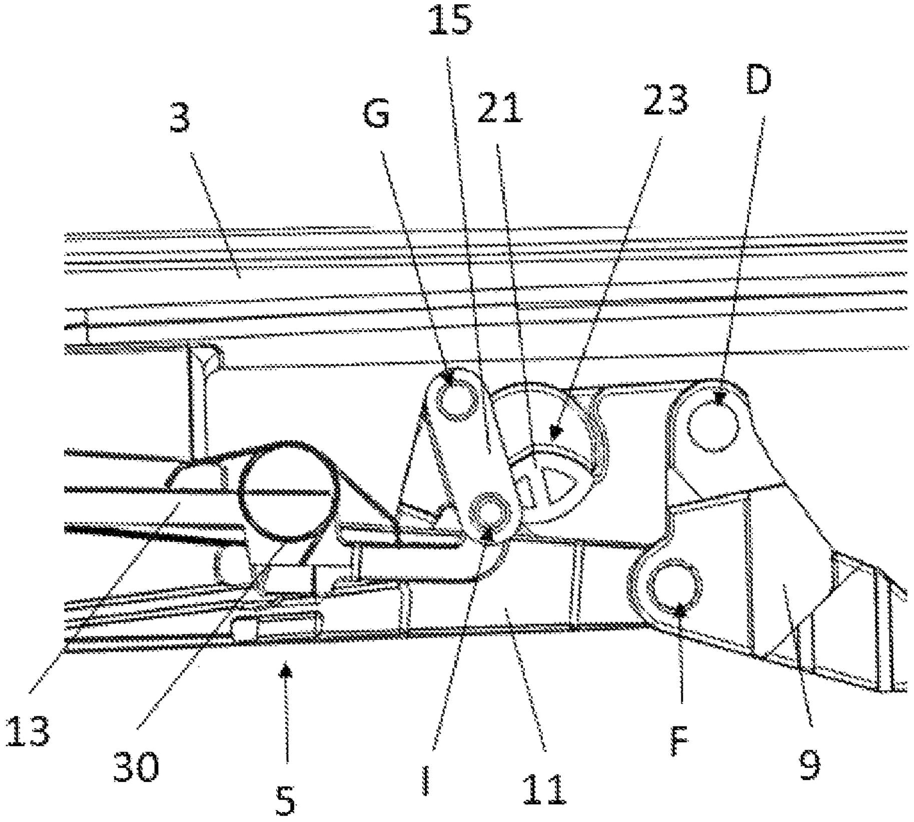
FIG. 7 is a detailed view of the deploying mechanism.

According to a specific embodiment illustrated in FIG. 7, the elastic return element 30 may be a helical spring. On tip of the spring may be fixed to the bracket 2 of the vehicle door handle assembly for instance while the other tip of the spring may be fixed to the locking rod. When the handle grip 3 is moved from the flushing position to the deployed position, the levers 7, 9, 15 and rods 11, 13 of the deploying mechanism 5 are moved in such a way that the elastic return element 30 is elastically deformed, thereby storing energy. When a user pulls the handle grip 3 from the deployed position into a protruding unlocking position, the levers 7, 9, 15 and rods 11, 13 of the deploying mechanism 5 are further moved in such a way that the energy stored in the elastic return element 30 is released. The elastic return element 30 then returns to its initial position, just like the rest of the levers 7, 9, 15 and rods 11, 13 of the deploying mechanism. All the parts are moved back into the position they occupy when the handle grip 3 is back in the flushing position.

Figure 8:
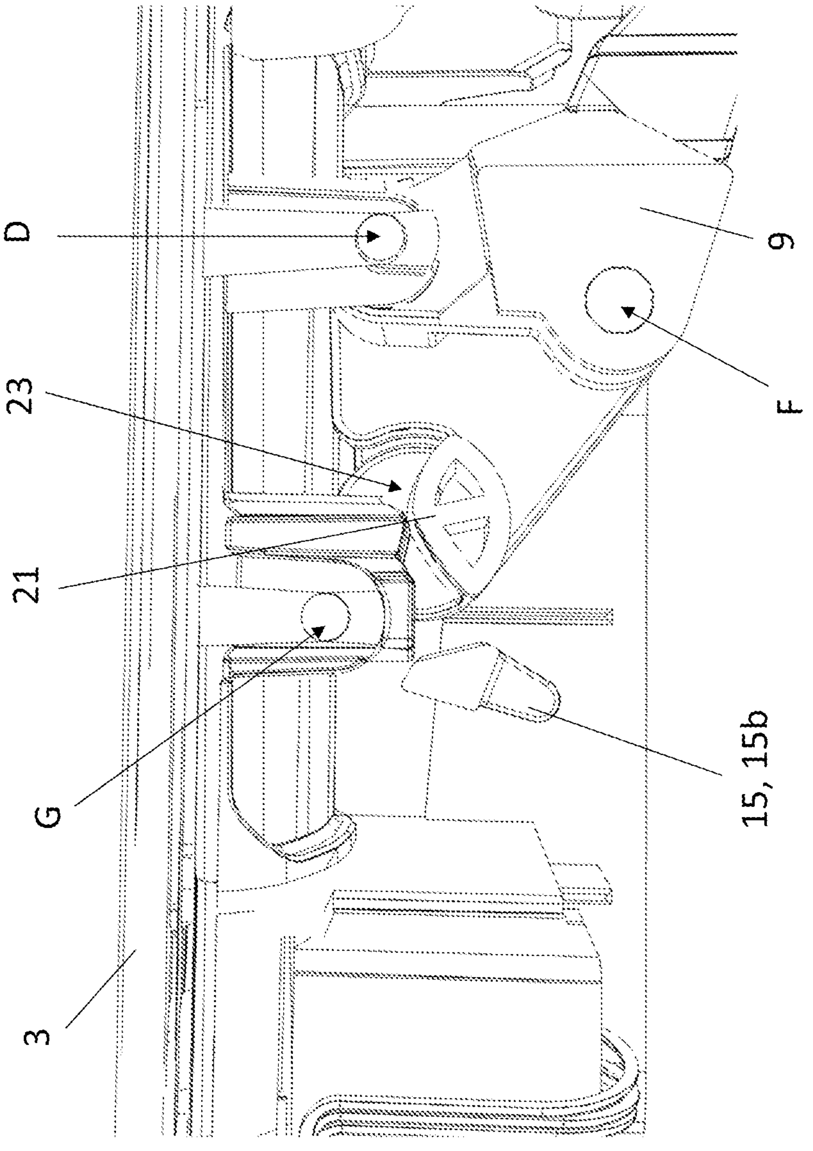
FIG. 8 is a view representing the device in the first position showing the blocking lever tilted so that it is no longer pressed either by the recess or the contact surface, when the handle grip is flush.

FIG. 8 represents the device in the first position showing the blocking lever 15 is tilted in such a way that it is no longer pressed either by the recess 14 or the contact surface 23, when the handle grip 3 is flush.

It is therefore possible to provide an improved and reliable deploying mechanism that ensures the stability of the handle grip in deployed position while also avoiding damage to the actuator gearbox in case a load and/or a shock is exerted on the handle grip.

The invention claimed is:

1. A vehicle door handle assembly assembly comprising a bracket and a deploying mechanism configured to move a handle grip between a flushing position in which the handle grip is flush with an exterior door panel surface and a deployed position in which the handle grip is protruding and graspable by a user, said deploying mechanism comprising one or two levers, each lever comprising a first pivot connection to the handle grip at a first end and a second pivot connection with the bracket, the rotation of a lever around said second pivot connection permitting to move the handle grip between its flushing position and its deployed position, the vehicle door handle assembly wherein the deploying mechanism further comprises:

a recess on the bracket, a contact surface on the at least one lever, and a blocking lever placed between said recess and said contact surface, the blocking lever having a pivot connection with the bracket, the blocking lever being configured to move from a first position, when the handle grip is flush, to a second position, when the handle grip is deployed, wherein in its second position, the blocking lever is pressed on one side against the recess on the bracket and on another side pressed against the contact surface of a lever, thereby blocking the rotation of a lever, and wherein in its first position, the blocking lever is tilted in such a way that it is no longer pressed either by the recess or the contact surface, allowing a lever of the deploying mechanism to rotate around their pivot connection to the handle grip, wherein the blocking lever comprises a first portion configured to act like a hinge for moving the blocking lever between the first and the second position, and a second portion configured to be pressed on one side against the recess on the bracket and on another side pressed against the contact surface of a lever when the blocking lever is in the second position.

2. The vehicle door handle assembly according to claim 1, wherein the deploying mechanism comprises two levers, a front lever and a rear lever which respectively comprise a first pivot connection to the handle grip at a first end and a second pivot connection with the bracket, the rotation of the front lever and the rear lever around said second pivot connections permitting to move the handle grip between its flushing position and its deployed position, the front lever and the rear lever also respectively comprising a third pivot connection with at least one linking rod at their second end.

3. The vehicle door handle assembly according to claim 2, wherein the blocking lever is pressed on one side against the recess on the bracket and on another side pressed against the contact surface of any of the front lever or the rear lever, thereby blocking the rotation of any of the front lever or the rear lever.

4. The vehicle door handle assembly according to claim 2, wherein the blocking lever is tilted in its first position in such a way that it is no longer pressed either by the recess or the contact surface, allowing any of the front lever or the rear lever of the deploying mechanism to rotate around their pivot connection to the handle grip.

5. The vehicle door handle assembly according to claim 2, wherein the deploying mechanism comprises a locking rod, a first end of the locking rod being connected to the second end of any of the front lever or the rear lever, thus forming a pivot connection, a second end of the locking rod being connected to the blocking lever, thus forming another pivot connection.

6. The vehicle door handle assembly according to claim 5, wherein the first end of the locking rod is connected to the second end of the front lever, the recess facing the rear lever, and wherein said rear lever comprises the contact surface, the blocking lever being placed between said recess and the rear lever.

7. The vehicle door handle assembly according to claim 6, wherein the pivot connection between the front lever and the linking rod and the pivot connection between the front lever and the locking rod share a common pivot axis.

8. The vehicle door handle assembly according to claim 1, wherein the first portion of the blocking lever comprises two straight branches which extend along a direction, this direction being perpendicular to the axes of the pivot connections (A, B, C, D, E, F, G, H, I) in the deploying mechanism.

9. The vehicle door handle assembly according to claim 1, wherein a part of the second portion of the blocking lever extends in a direction which is be perpendicular to the axes of the pivot connections in the deploying mechanism and in that there is an angular offset between the direction along which said part of the second portion extends and the direction along which the load resulting from a pressure exerted on the deployed handle grip is oriented.

10. The vehicle door handle assembly according to claim 1, wherein the recess on the bracket has a complementary shape to an angular area on the second portion of the blocking lever.

11. The vehicle door handle assembly according to claim 1, wherein it further comprises an elastic return element configured to move the blocking lever back in the first position when the handle grip is being moved from the deployed position to a protruding unlocking position.

12. The vehicle door handle assembly according to claim 1, wherein the blocking lever is a one-piece part.

* * * * *